United States Patent Office 3,013,049
Patented Dec. 12, 1961

3,013,049
AMINES
Hans Holtschmidt, Koln-Stammheim, and Hugo Wilms, Leverkusen, Germany, assignors to Farbenfabriken Bayer Aktiengesellschaft, Leverkusen, Germany, a corporation of Germany
No Drawing. Filed Jan. 30, 1959, Ser. No. 790,034
Claims priority, application Germany Feb. 1, 1958
6 Claims. (Cl. 260—461)

This invention relates to aromatic amines and more particularly to amino aromatic esters, thioesters and amide derivatives of phosphoric acid and thiophosphoric acids.

It is an object of this invention to provide amino aromatic phosphoric acid and thiophosphoric acid derivatives. Another object of this invention is to provide amino aromatic phosphoric acid and thiophosphoric acid derivatives which may be used to prepare useful dyestuffs and plastics having improved flame resistance. Still another object of this invention is to provide a process for the preparation of arylamino phosphoric acid and thiophosphoric acid derivatives.

These objects and others, which will become obvious from the following disclosure, are accomplished, in accordance with the invention, generally speaking, by providing amino aryl derivatives of phosphoric acids. Thus, this invention contemplates amino aryl phosphorous esters, thioesters and amides having the formula

wherein X is oxygen or sulphur, R represents O-aryl, O-aralkyl, O-alkaryl, O-cycloalkaryl, NH-aryl, N-(aryl)$_2$, N(alkyl)(aryl), NH-alkyl, N(alkyl)$_2$, NH-aralkyl, N(aralkyl)$_2$, NH-cycloalkaryl or N(cycloalkaryl)$_2$; R' and R'' may be either the same or different and may be R, O-alkyl, O-cycloalkyl, NH-alkyl, N-(alkyl)$_2$, NH-cycloalkyl, N-(cycloalkyl)$_2$; at least one of the aryl radicals contains at least one amino group bonded to a carbon atom of the aromatic ring. The invention therefore contemplates compounds, such as, for example, 4,4',4''-triamino phenyl phosphate

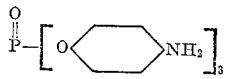

4,4',4''-triamino phenyl thiophosphate

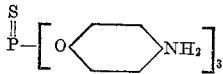

4,4',4''-triamino benzyl phosphate

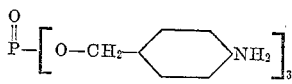

4,4',4''-triamino benzyl thiophosphate

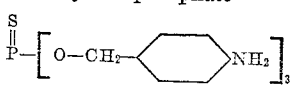

Diethyl-4-amino phenyl phosphoric acid triester

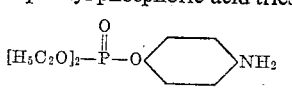

Diethyl-4-amino phenyl thiophosphoric acid triester

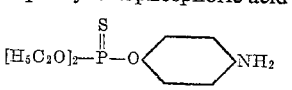

N,N',N''-4,4',4''-triamino tribenzylphosphoramide

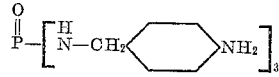

N,N',N''-4,4',4''-triamino tribenzyl thiohosphoramide

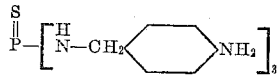

Cyclopentadienyl-4-amino phenyl phosphoric acid diester, dimethyl amide

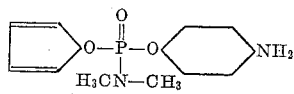

Cyclopentadienyl-4-amino phenyl thiophosphoric acid diester dimethyl amide

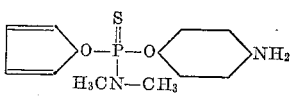

Ethyl vinyl-4-amino naphthyl phosphoric acid triester

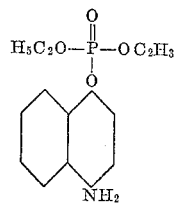

Ethyl vinyl-4-amino naphthyl thiophosphoric acid triester

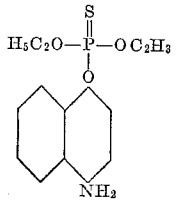

Ethyl phosphoric acid ester bis-(N-methyl - N - 4 - amino phenyl amide)

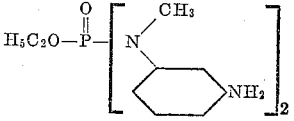

Ethyl thiophosphoric acid ester bis-(N-methyl-N-4-amino phenyl amide)

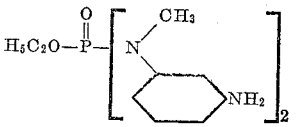

(3-amino-5-methyl phenyl) phosphoric acid triester

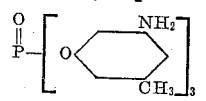

(3-amino-5-methyl phenyl) thiophosphoric acid triester

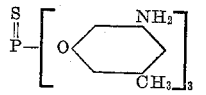

(3-amino-5-methyl phenyl) dithiophosphoric acid triester

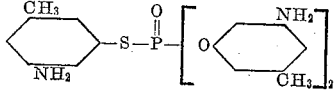

4-amino-6-chlorophenyl diethyl phosphoric acid triester

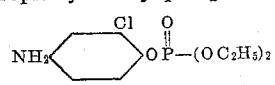

4-amino-6-chlorophenyl diethyl thiophosphoric acid triester

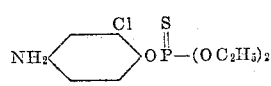

Ethyl phosphoric acid ester bis-(N-4-amino phenyl amide)

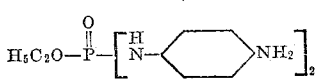

Phenyl phosphoric acid ester bis-(N,N-4-amino phenyl amide)

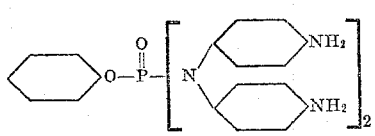

Ethyl phosphoric acid ester bis-(N-3-amino-5-methyl phenyl amide)

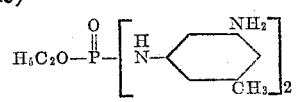

Phenyl phosphoric acid ester bis-(N,N-3-amino-5-methyl phenyl amide)

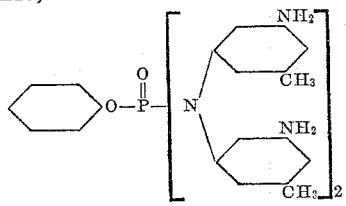

Phenyl phosphoric acid diester, N,N-4-amino benzyl amide

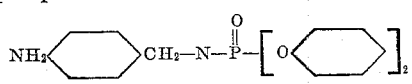

The substituents in the above-mentioned formula may also contain further substituents, such as, for example, halogen, such as, chlorine, iodine, and bromine; alkoxy, such as methoxy, ethoxy, and propoxy; carboxylic acid ester, such as, carbomethoxy, carboethoxy, and carbobutoxy, in addition to the amino group which is attached to a carbon atom of an aromatic ring. Further, compounds containing more than one phosphoric acid or thiophosphoric acid nucleus are contemplated by the invention. In such cases R' and R" may represent radicals of polyhydric alcohols, such as, for example, ethylene glycol, 1,3-propylene glycol, 1,4-butylene glycol and the like, polyvalent amines, such as, for example, ethylene diamine, 1,3-propylene diamine, 1,4-butylene diamine, N,N-dimethylethylene diamine, N,N-diethyl-1,3-propylene diamine, N,N-dimethyl-1,3-phenylene diamine, and the like, linear or branched polyesters, such as, for example, the reaction product of succinic acid with trimethylol propane or ethylene glycol, and the like, polyethers, such as, for example, those obtained from the condensation of alkylene oxides and compounds such as diethylene glycol, polyamides, polyester amides, such as, for example, the reaction product of succinic acid with amino alcohols and more particularly 1-amino, 2-hydroxy ethylene and the like which link two or more phosphoric acid or thiophosphoric acid nuclei through oxygen, and/or nitrogen atoms. Representative compounds of this type contemplated by the inventors are, for example, those having the following formulae:

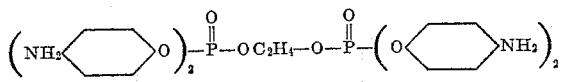

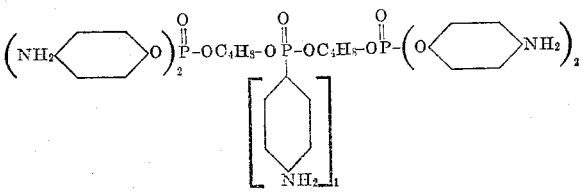

The new amines are prepared by catalytically reducing the corresponding nitro aryl phosphoric acid derivatives. The catalytic reduction in a smooth reaction and with a good yield starts from the corresponding nitro compounds the nitro groups of which being reverted into an amino group. The nitro starting materials can be made by nitration of suitable phosphoric acid and thiophosphoric acid esters, thioesters, and amines such as, for example, triphenyl phosphate, tricresyl phosphate, triphenyl thiophosphate, triphenyl phosphor amide and the like. The nitro derivatives which are reduced in accordance with the process of this invention to prepare the new aromatic amines may be prepared by the reaction of phosphoric acid chlorides or substituted phosphoric acid chlorides with nitro phenols and the like, such as, for example, nitro benzyl alcohol, nitro naphthol, and nitro naphthyl phenol.

The reduction of the nitroaryl-(thio)-phosphoric acid derivatives with catalytic hydrogen is preferably carried out in an inert solvent, it being particularly preferred to use those solvents which dissolve the water formed, such as lower alcohols, for example methanol, ethanol or propanol, and also ethers such as dibutyl ether, tetrahydrofuran or dioxane, or esters such as methyl acetate. It is advantageous to use concentrations of 10–25%, although it is quite possible to hydrogenate in either greater dilution or higher concentrations with good results. With liquid materials it is, of course, also possible to hydrogenate without using solvents.

Metal catalysts, such as Raney nickel, Raney iron, Raney cobalt or precious metals, are advisable to use the catalysts in quantities of from 0.5 to 10%, and advantageously from 1 to 2%.

The hydrogenation can be carried out at room temperature. To obtain a better yield, however, it is recommended to raise the temperature slightly, although too high a temperature should be avoided, and it is therefore preferred to use temperatures between 30° C. and 90° C. It is possible to operate either at atmospheric pressure, or at a slight or even at a substantial super-atmospheric pressure.

The amino compounds which correspond to the nitro compounds used are formed in a good yield, which exceeds 80% of the theoretical in practically all cases. They can be separated from the solvent in the manner usual for amines, once the absorption of hydrogen has stopped and the solution has been freed from the catalyst, this being effected for example by evaporating or distilling off the solvent together with the water formed in the reduction, or by salting out, freezing out or precipitating with water.

It is surprising that these new aryl-(thio)-phosphoric acid derivatives containing primary amino groups are formed in a smooth reaction by catalytic hydrogenation from the corresponding nitro compounds without the occurrence of, for example, transamidation and saponification by the water formed in the reaction or, more especially, catalyst poisoning by the sulphur present in the thiophosphoric acid derivatives.

*Example 1*

About 461 g. (1 mol) of p-nitrophenyl-phosphoric acid-triester, prepared by nitration of triphenyl phosphate in nitric acid (density 1.51) at about −5° C. to about 0° C. are dissolved in about 3000 cc. of methanol and introduced into a 7-liter stirrer-type autoclave after adding about 25 g. of fresh Raney nickel. The reduction is completed after about 2-3 hours at a temperature of about 50° C. and a hydrogen pressure between about 20 and about 40 atm.

In working up the product, the reaction mixture is filtered while heating, from the hydrogenation catalyst and the filtrate is cooled with ice. About 105 g. of the p-aminophenylphosphoric acid-triester are crystallized out in the form of small needles. After filtering with suction, the remainder of the amino-compound is obtained by precipitation with water, whereby about another 210 g. crystallize out, so that the total yield is about 315 g. (85% of the theoretical). In this way the substance is obtained in an analytically pure form having a sharp melting point. It can be recrystallized from alcohol and is completely soluble in 10% hydrochloric acid and has a melting point of 155° C.

*Analysis.*—Calculated: C, 58.3%; H, 4.86%; N, 11.31%; P, 8.36%. Found: C, 58.13; H, 5.0%; N, 11.40%; P, 8.5%.

*Example 2*

About 195 g. of p-nitrophenyl-thiophosphoric acid-triester, prepared from nitrophenol sodium plus $PSCl_3$ in xylene (M.P. 181° C.–183° C.) are dissolved in 1.2 liters of methanol and, after adding about 30 g. of Raney nickel, are hydrogenated at a temperature of about 50°–75° C. and at a hydrogen pressure of about 20–40 atm. The absorption of hydrogen is complete after two hours. After filtering, the main quantity of the p-aminophenyl-thiophosphoric acid-triester crystallizes out from the methanol, and the remainder can be obtained by precipitation with water. Yield: 152 g. (97.5% of the theoretical), M.P. 156° C.

*Analysis.*—Calculated for $C_{18}H_{18}O_3N_3PS$: C=56.0%, H=4.6%, N=10.8%, S=8.2%, P=8.0%. Found: C=55.6%, H=4.9%, N=10.8%, S=8.2%, P=8.2%.

*Example 3*

About 95 g. of diethyl-p-nitrophenyl-thiophosphoric acid triester, dissolved in about 300 cc. of methanol, are hydrogenated in the presence of about 25 g. of Raney nickel at between about 50° and about 60° C. and under a hydrogen pressure of about 20–40 atm. The hydrogen absorption is complete after three hours, whereafter the solid material is filtered off from the catalyst and the methanol solution is concentrated. The residue is a reddish-yellow oil which is completely soluble in 10% hydrochloric acid. Yield: 86 g.

*Analysis.*—Calculated: N=5.7%, S=13.0%, P=12.0%. Found: N=5.56%, S=12.0%, P=12.6%.

Analysis of the phenyl urea (M.P. 108° C.): Calculated—N=7.7%, S=8.8%, P=8.5%. Found—N=7.8%, S=8.3%, P=8.5%.

*Example 4*

About 302 g. of p-nitrophenyl-phosphoric acid-diester dimethylamide (prepared from N-dimethylamino-phosphoric acid dichloride and nitrophenol sodium, M.P. 148° C.) are hydrogenated in about 1.2 liters of methanol at about 60° C.–75° C. after the addition of about 30 g. of Raney nickel. The hydrogenation is complete after three hours; the solid material is filtered off from the catalyst and the filtrate is concentrated. A light yellow oil which crystallizes on stirring with methylene chloride is left. Yield: 258 g., M.P. 101° C.–103° C. (with decomposition).

*Analysis.*—Calculated: C=54.6%, H=5.8%, N=13.7%, P=10.1%. Found: C=54.6%, H=5.8%, N=14.2%, P=10.1%.

*Example 5*

About 268 g. of p-nitrophenyl-phosphoric acid-diester methyl phenylamide (prepared according to Example 4) are hydrogenated and worked up as in Example 4. Yield 220 g., M.P. 110° C.–111° C.

*Analysis.*—Calculated: C=61.9%, H=5.4%, N=11.4%, P=8.4%. Found: C=61.9%, H=5.7%, N=11.7%, P=8.5%.

Although only some of the aforementioned amino aryl phosphoric acid and thiophosphoric acid derivatives were prepared in the foregoing examples, it is to be understood that any of the class of phosphoric acid derivatives more fully disclosed above can be prepared in a similar manner. Further, any of the corresponding nitro compounds, more fully disclosed above can be catalytically reduced in accordance with the process disclosed by the examples to produce the corresponding amino aryl phosphoric acid derivatives.

*Example 6*

18.7 grams of p-amino phenyl thiophosphoric acid triester are suspended in 250 grams of water and 30 grams of hydrochloric acid (d.=1.19). The suspension is diazotized at 0–5° C. with a solution of 10 grams of sodium nitrite in 25 grams of water. The diazo solution is then combined at 5° C. with a fine suspension of 35 grams of 2-amino-8-naphtol-6-sulphonic acid in 500 grams of water. 50 grams of sodium acetate are then added slowly. After coupling is completed the reaction mixture is heated to 60–70° C. The dyestuff is separated out by adding sodium chloride. The precipitate is filtered off and dried. The dyestuff is a red powder which dissolves in water with a red color. Wool is dyed out of an acid bath in red shades with excellent fastness.

If the 2-amino-8-naphtol-6-sulphonic acid is replaced by 37 grams of 1-phenyl-3-methyl-5-amino pyrazol-3'-sulphonic acid a dyestuff is obtained which dyes wool in yellow shades with excellent fastness.

It is obvious that the process of the invention may be used to produce monoamines, diamines, triamines, or higher polyamines. The monoamines and polyamines obtainable by the process of the present invention are useful as starting materials, for instance, for the manufacture of dyestuffs and plastics. In well known processes, they may be diazotized and then coupled to give azo dyes. The polyamines can further be used as cross-linker for epoxy resins. Together with polyfunctional carboxylic acid chlorides they can be transformed into polyamides. Reaction with, for instance, diisocyanates leads to polyureas.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:
1. 4,4',4''-triamino phenyl phosphate.
2. 4,4',4''-triamino phenyl thiophosphate.
3. (p-Amino phenyl) - phosphoric - diester - monomethyl phenyl amide.
4. An amino phosphorous compound having the formula

wherein X is a chalcogen having an atomic weight between 16 and 33 and R, R' and R'' are each O-phenylene-$NH_2$ radicals.

5. An amino phosphorous compound having the formula

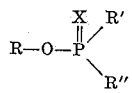

wherein X is a chalcogen having an atomic weight from 16 to 33; R stands for phenyl; R' is selected from the group consisting of O-phenyl, O-lower alkyl, N-(lower alkyl)₂ and N-(lower alkyl) (phenyl); and R″ is selected from the group consisting of O-phenyl and N-(lower alkyl) (phenyl); said compound containing at least two NH₂ groups bonded to carbon atoms of different phenyl radicals.

6. A process for obtaining an amino phosphorous compound having the formula

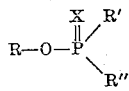

wherein X is a chalcogen having an atomic weight from 16 to 33; R stands for phenyl; R′ is selected from the group consisting of O-phenyl, O-lower alkyl, N-(lower alkyl)₂ and N-(lower alkyl) (phenyl); and R″ is selected from the group consisting of O-phenyl and N-(lower alkyl) (phenyl); said compound containing at least two NH₂ groups bonded to carbon atoms of different phenyl radicals, which comprises hydrogenating with catalytically activated hydrogen corresponding nitro aryl phosphate.

References Cited in the file of this patent

UNITED STATES PATENTS 2,759,961  Fitch _____ Aug. 21, 1956

OTHER REFERENCES

Averell et al.: Analytical Chem. 20, 753–756 (1948).